United States Patent
Oh et al.

(10) Patent No.: US 8,729,798 B2
(45) Date of Patent: May 20, 2014

(54) ANTI-REFLECTIVE NANOPOROUS SILICON FOR EFFICIENT HYDROGEN PRODUCTION

(75) Inventors: Jihun Oh, Lakewood, CO (US); Howard M. Branz, Boulder, CO (US)

(73) Assignee: Alliance for Sustainable Energy, LLC, Golden, CO (US)

(*) Notice: Subject to any disclaimer, the term of this patent is extended or adjusted under 35 U.S.C. 154(b) by 166 days.

(21) Appl. No.: 13/284,861

(22) Filed: Oct. 28, 2011

(65) Prior Publication Data

US 2012/0103825 A1    May 3, 2012

Related U.S. Application Data

(63) Continuation-in-part of application No. 12/053,372, filed on Mar. 21, 2008, now Pat. No. 8,075,792, and a continuation-in-part of application No. 12/053,445, filed on Mar. 21, 2008.

(60) Provisional application No. 61/407,822, filed on Oct. 28, 2010.

(51) Int. Cl.
  *H01J 40/06* (2006.01)
  *C03C 15/00* (2006.01)

(52) U.S. Cl.
  USPC .................. 313/542; 216/99; 204/290.03

(58) Field of Classification Search
  USPC ............ 313/542; 216/99; 204/290.03, 242, 204/290.01, 291
  See application file for complete search history.

(56) References Cited

U.S. PATENT DOCUMENTS

| | | | |
|---|---|---|---|
| 4,111,762 A | 9/1978 | Wade et al. |
| 5,196,088 A | 3/1993 | Soda |
| 5,264,375 A | 11/1993 | Bang et al. |
| 6,093,941 A | 7/2000 | Russell et al. |
| 6,178,033 B1 | 1/2001 | Ford et al. |
| 6,284,317 B1 | 9/2001 | Laibinis et al. |
| 6,329,296 B1 | 12/2001 | Ruby et al. |
| 6,538,801 B2 | 3/2003 | Jacobson et al. |
| 6,721,083 B2 | 4/2004 | Jacobson et al. |
| 6,759,313 B2 | 7/2004 | Yamakazi et al. |
| 6,762,134 B2 | 7/2004 | Bohn et al. |
| 6,790,785 B1 | 9/2004 | Li et al. |
| 6,899,816 B2 | 5/2005 | Padhi et al. |
| 6,905,622 B2 | 6/2005 | Padhi et al. |
| 7,052,587 B2 | 5/2006 | Gibson et al. |

(Continued)

FOREIGN PATENT DOCUMENTS

| | | |
|---|---|---|
| JP | 2000261008 | 9/2000 |
| JP | 2005183505 | 7/2005 |

(Continued)

OTHER PUBLICATIONS

Kelly, N.A., et al. "Design and characterization of a robust photoelectrochemical device to generate hydrogen using solar water splitting," Intl Journal of Hydrogen Energy, 31 (2006) 1658-1673 Elsevier.

(Continued)

*Primary Examiner* — Joseph L Williams
(74) *Attorney, Agent, or Firm* — John C. Stolpa (57) ABSTRACT

Exemplary embodiments are disclosed of anti-reflective nanoporous silicon for efficient hydrogen production by photoelectrolysis of water. A nanoporous black Si is disclosed as an efficient photocathode for $H_2$ production from water splitting half-reaction.

20 Claims, 3 Drawing Sheets

(56) References Cited

U.S. PATENT DOCUMENTS

| | | |
|---|---|---|
| 7,090,783 B1 | 8/2006 | Cui et al. |
| 7,135,414 B2 | 11/2006 | Matsumura et al. |
| 7,141,490 B2 | 11/2006 | Yamakazi et al. |
| 7,476,573 B2 | 1/2009 | Cohen |
| 7,585,786 B2 | 9/2009 | Goo et al. |
| 7,718,254 B2 | 5/2010 | Matsumura et al. |
| 8,053,270 B2 | 11/2011 | Dimitrov et al. |
| 8,053,328 B2 | 11/2011 | Cohen |
| 8,075,792 B1 | 12/2011 | Branz et al. |
| 8,119,438 B2 | 2/2012 | Nishimoto |
| 8,124,535 B2 | 2/2012 | Lin et al. |
| 8,193,095 B2 | 6/2012 | Lin et al. |
| 8,334,216 B2 | 12/2012 | Lin et al. |
| 8,486,843 B2 | 7/2013 | Li et al. |
| 2002/0068421 A1 | 6/2002 | Yamakazi et al. |
| 2002/0104552 A1 | 8/2002 | Bay |
| 2002/0123227 A1 | 9/2002 | Winningham et al. |
| 2002/0145792 A1 | 10/2002 | Jacobson et al. |
| 2003/0096113 A1 | 5/2003 | Jacobson et al. |
| 2003/0119332 A1 | 6/2003 | Kuebelbeck et al. |
| 2003/0190812 A1 | 10/2003 | Padhi et al. |
| 2004/0100594 A1 | 5/2004 | Huibers et al. |
| 2004/0100677 A1 | 5/2004 | Huibers et al. |
| 2004/0241967 A1 | 12/2004 | Yamakazi et al. |
| 2005/0056118 A1 | 3/2005 | Xia et al. |
| 2005/0101153 A1 | 5/2005 | Matsumura et al. |
| 2005/0130439 A1 | 6/2005 | Goo et al. |
| 2005/0137531 A1 | 6/2005 | Prausnitz et al. |
| 2005/0271805 A1 | 12/2005 | Kambe et al. |
| 2006/0281333 A1 | 12/2006 | Shin et al. |
| 2006/0281334 A1 | 12/2006 | Shin et al. |
| 2007/0121205 A1 | 5/2007 | Miles |
| 2007/0148922 A1 | 6/2007 | Yamakazi et al. |
| 2007/0152234 A1 | 7/2007 | Yamamoto et al. |
| 2007/0155021 A1 | 7/2007 | Zhang et al. |
| 2007/0155022 A1 | 7/2007 | Yamakawa et al. |
| 2007/0184576 A1 | 8/2007 | Chang et al. |
| 2007/0190326 A1 | 8/2007 | Perry et al. |
| 2007/0206267 A1 | 9/2007 | Tung et al. |
| 2007/0247620 A1 | 10/2007 | Koo |
| 2007/0281249 A1 | 12/2007 | Tutt et al. |
| 2009/0026070 A1 | 1/2009 | Fan et al. |
| 2009/0183776 A1 | 7/2009 | Kwag et al. |
| 2009/0236317 A1 | 9/2009 | Yost et al. |
| 2009/0293946 A1 | 12/2009 | Lin et al. |
| 2010/0187123 A1* | 7/2010 | Bocarsly et al. ............ 205/340 |
| 2010/0248449 A1 | 9/2010 | Hildreth et al. |
| 2010/0270263 A1 | 10/2010 | Li et al. |
| 2010/0270650 A1 | 10/2010 | Li et al. |
| 2011/0030610 A1 | 2/2011 | Kamian et al. |
| 2011/0143484 A1 | 6/2011 | Lin et al. |
| 2011/0303265 A1 | 12/2011 | Yuan et al. |
| 2012/0024365 A1 | 2/2012 | Branz et al. |
| 2012/0088372 A1 | 4/2012 | Chien et al. |
| 2012/0103825 A1 | 5/2012 | Oh et al. |
| 2012/0178204 A1 | 7/2012 | Toor et al. |
| 2012/0225517 A1 | 9/2012 | Zhang et al. |
| 2013/0052762 A1 | 2/2013 | Li et al. |

FOREIGN PATENT DOCUMENTS

| | | |
|---|---|---|
| JP | 2005277208 | 10/2005 |
| JP | 2007305748 | 11/2007 |
| JP | 2009209420 | 9/2009 |
| WO | 03105209 | 12/2003 |
| WO | 2005059985 | 6/2005 |
| WO | 2006051727 | 5/2006 |
| WO | 2007083152 | 7/2007 |
| WO | 2007025536 | 8/2007 |
| WO | 2009117642 | 3/2009 |
| WO | 2011060193 | 5/2011 |
| WO | 2011161479 | 12/2011 |

OTHER PUBLICATIONS

Koshida, N., et al. "Photoelectrochemical Behavior of n-Type Porous-Si Electrodes," Japanese Journal of Applied Physics, vol. 25, No. 7, Jul. 1986 1069-1072.

Li, Y., et al., "Hydrogen generation from photoelectrochemical water splitting based on nanomaterials," Laser Photonics Rev. 4, No. 4, 517-528 (2010).

Menna, P., et al., "Porous silicon in solar cells: A review and a description of its application as an AR coating," Solar Energy Materials and Solar Cells 37 (1995) 13-24.

Branz et al., "Nanostructured Black Silicon and the Optical Reflectance of Graded-Density Surfaces," Applied Physics Letters vol. 94, Issue 23, Jun. 2009, pp. 231121 (1-3).

Yuan, et al., "Efficient Black Sikocon Solar Cell With a Density-Graded Nanoporous Surface; Optical Properties, Performance Limitations, and Design Rules," Applied Physics Letters vol. 95, Issue 12, Sep. 2009, pp. 123501 (1-3).

Toor et al.,"Multi-Surface Texture to Improve Blue Response of Nanoporous Black Silicon Solar Cells," Applied Physics Letters vol. 99, Issue 10, Sep. 2011, pp. 10103501 (1-3).

Lee, et al., "Extremely Superhydrophobic Surfaces With Micro- and Nanostructures Fabricated by Copper Catalytice Etching," Langmuir Article, vol. 27, Issue 2, Jan. 18, 2011, pp. 809-814.

Huang et al., "Metal-Assited Electrochemical Etching of Silicon," Nanotechnology, vol. 21, Nov. 19, 2010 pp. 465301 (1-6).

Peng et al., "Fabrication of Single-Crystalline Silicon Nanowires y Scratching a Silicon Surface With Catalytic Metal Particles," Advanced Functional Materials, vol. 16, Issue 3, Feb. 2006, pp. 387-394.

Lee et al., "Patterning of Various Silicon Structures Via Polymer Lithography and Catalytic Chemical Etching," Nanotechnology, vol. 22, Issue 27, Jul. 8, 2011, pp. 275305 (1-6).

Liu et al., "Efficient SERS Substrates Made by Electroless Silver Deposition Into Patterned Silicon Structures," Journal of Material Chemistry, vol. 14, Issue 10, Apr. 21, 2004 (1st published on line), pp. 1526-1532.

Tsujino et al., "Texturization of Multicyrstalline Silicon Wafers for Solar Cells by Chemical Treatment Using Metallic Catalyst," Solar Energy Materials & Solar Cells, vol. 90, Issue 1, Jan. 2006, pp. 100-110.

Li et al., "Metal-Assisted Chemical Etching in HF/H2O2 Procedures Porous Silicon," Applied Physics Letters vol. 77, Issue16, Oct. 2000, pp. 2573-2574.

Nishioka et al., "Antireflection Subwavelength Structure of Silicon Surface Formed by•Wet Process Using Catalysis of Single Nano-sized Gold Particle," Solar Energy Materials and Solar Cells, vol. 92, Issue 8, Aug. 2008, pp. 919-922.

Putnam et al., "10um minority-carrier diffusion lengths in Si Wires snythesized by Cu-catalyzed vapor-liquid-solid growth," Applied Physics Letters, vol. 95, Issue 16, Oct. 19, 2009, pp. 163116-1-163116-3.

Kuzuma-Filipek et al., ">16% thin-film epitaxial silicon solar cells on 70-cm2 area with 30-us active layer, porous silicon back reflector, and Cu-based top-contact metallization," Progress in Photovoltaics: research and applications, vol. 20, Issue 3, May 2012, pp. 350-355.

Nishioka et al, "Nano-sized Taper Structure Formed by Wet Process Using Catalysis of God Nanoparticle," School of Material Science, Japan Advanced Institute of Science and Technology, 2007.

Koynov et al., "Black multi-crystalline silicon solar cells," Rapid Research Letters, vol. 1, Issue 2, Mar. 2007, pp. R53-R55.

Koynov et al, "Black nonreflecting silicon surfaces for solar cells," Applied Physics Letter, vol. 88, Issue 30, May 2006, pp. 203107-1.

PCT/US09/37776 International Search Report and Written Opinion dated Sep. 28, 2009.

PCT/US09/37776 International Preliminary Report on Patentability dated Sep. 21, 2010.

PCT/US13/30257 International Search Report and Written Opinion dated May 16, 2013.

Japanese Application No. 500974/2011 Office Action dated Mar. 13, 2012 with English translation.

Chinese Application No. 200980110274.3 Office Action dated Dec. 25, 2012 with English translation.

(56) References Cited

OTHER PUBLICATIONS

Chinese Application No. 200980110274.3 Office Action dated Jun. 27, 2013 with English translation.
Chinese Application No. 200980110274.3 Office Action dated Jul. 10, 2012 with English translation.
Chinese Application No. 200980110274.3 Office Action dated Dec. 23, 2011 with English translation.
Barton et al., "Selective Solar-Driven Reduction of CO2 to Methanol Using a Catalyzed p-GaP Based Photoelectrochemical Cell," J. Am. Chem. Soc., vol. 130, Issue 20, May 21, 2008, pp. 6342-6344.
Li et al., "Solution-Processable Graphene Oxide as an Efficient Hole Transport Layer in Polymer Solar Cells," ACSNANO, vol. 4, Issue 6, Jun. 22, 2010, pp. 3169-3174.
Roy et al., "Toward Solar Fuels: Photocatalytic Conversion of Carbon Dioxide to Hydrocarbons," ACSNAMO vol. 4, Issue 3, Mar. 23, 2010, pp. 1259-1278.
Yu et al., "Effective Utilization of Visible Light (Including $\lambda > 600$ nm) in Phenol Degradation with p-Silicon Nanowire/TiO2 Core/Shell Heterojunction Array Cathode," Environmental Science & Technology vol. 43, Issue 20, Oct. 15, 2009, pp. 7849-7855.

* cited by examiner

ANTI-REFLECTIVE NANOPOROUS SILICON FOR EFFICIENT HYDROGEN PRODUCTION

CROSS-REFERENCE TO RELATED APPLICATION

This application claims the benefit of U.S. Provisional Application No. 61/407,822, filed Oct. 28, 2010; and is a continuation in part of co-pending U.S. patent application Ser. No. 12/053,372, entitled "Nanoparticle based Etching of Silicon Surfaces," filed Mar. 21, 2008, and U.S. patent application Ser. No. 12/053,445, entitled "Anti-Reflection Etching of Silicon Surfaces Catalyzed with Ionic Metal Solutions," filed Mar. 21, 2008, which are incorporated herein by reference in their entirety.

CONTRACTUAL ORIGIN

The United States Government has rights in this invention under Contract No. DE-AC36-08GO28308 between the United States Department of Energy and the Alliance for Sustainable Energy, LLC, the manager and operator of the National Renewable Energy Laboratory.

BACKGROUND

The described subject matter relates to anti-reflective nanoporous silicon for photoelectrodes for efficient production of solar fuels, such as hydrogen production by photoelectrolysis of water. In recent years, there has been a great deal of excitement about hydrogen, which is a potentially high-efficiency, environmentally clean fuel. Photoelectrochemical (PEC) production of $H_2$ at a semiconductor/electrolyte interface has drawn much attention as a viable route to direct conversion of solar energy to a storable and clean fuel. Silicon is an earth-abundant element and a promising material for PEC water electrolysis half-reaction to produce hydrogen ($H_2$), because of appropriate conduction band edge position relative to hydrogen evolution reaction (HER) potential, $E^o$ ($H_2/H_2O$), and small band gap ($E_g$=1.12 eV) to absorb most of sunlight. The p-type silicon can be used as a photocathode in a PEC cell in conjunction with an n-type photoanode, i.e., so called photochemical diodes or Z-scheme, for direct photoelectrolysis of water. However, about 25% of incident photons are reflected away at the silicon-water interface. To further maximize conversion and storage of solar energy to $H_2$, therefore, low reflectance silicon (Si) surface is used. Thin films of SiNx and indium tin oxide (ITO) have been adopted as anti-reflection (AR) coatings on Si surface for solid-state photovoltaic (PV) devices. For photoelectrochemical generation of $H_2$, however, the conventional AR coatings used in solid-state PV devices are difficult to implement, since the AR coatings prevent charge transfer from Si to the AR coating/electrolyte interface to produce of $H_2$, due to poor electrical properties of AR coatings (i.e., SiNx) and/or chemical instability associated with corrosion (i.e., ITO and $WO_3$) in contact with the aggressive aqueous electrolytes. Furthermore, such AR coatings generally prevent reflection only in a narrow band of wavelengths and for a narrow range of incident light angles, while efficient photoelectrochemistry in sunlight uses a broadband antireflection that works at all solar angles. Therefore, it is desired to develop a robust and broadband anti-reflective Si structure without heterogeneous AR coatings for reliable and efficient production of $H_2$ at the Si/electrolyte interface by photoelectrolysis of water.

The foregoing examples of the related art and limitations related therewith are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than limiting.

FIG. 2. Illustrates a graph of photoelectrochemical (PEC) current-voltage, j-V, curves of Si photocathodes for water splitting half-reaction to produce $H_2$ under simulated 1 sun illumination. The j-V curves were scanned from −1.5V vs. Ag/AgCl (3M KCl) reference electrode to 0.05 V vs. open circuit voltage (OCV) in 0.5 M sulfuric acid with the addition of Zonyl-FSN 100 as a surfactant. The illuminated nanoporous Si exhibit 20% increase of the limiting photocurrent is due to suppressed optical reflection. The increased effective surface area of the nanoporous Si shifts the j-V curve anodically. Both increased the limiting photocurrent and anodic shift of the j-V curve contribute to enhanced PEC $H_2$ evolution rate from the nanoporous Si. The red dotted line is normalized j-V curve of the polished Si to the limiting photocurrent density of the nanoporous Si and indicates that the anodic shift of the j-V curve of the nanoporous Si originates from increased surface area.

FIG. 3. Shows a graph illustrating the incident-photon-to-current conversion efficiency (IPCE) of Si photocathodes for water reduction reaction to produce $H_2$. 0.5 M sulfuric acid with addition of a surfactant (Zonyl-FSN 100, Dupont) was used as an electrolyte. Both electrodes were biased at −1.0 V vs. Ag/AgCl (3M KCl) reference electrode to achieve the limiting photocurrent. The nanoporous Si shows increased IPCE over the polished Si from increased optical absorption. However, increased effective surface area and the remaining Au impurities at the surface caused lower IPCE at shorter wavelengths.

FIG. 4. Illustrates the effects of a surfactant and nanostructures on $H_2$ gas evolution on Si photocathodes. Both electrodes were biased at −1.5 V vs. the Ag/AgCl (3M KCl) reference electrode in 0.5 M sulfuric acid under 1 sun illumination. Addition of small amount of a surfactant (2 g/L of Zonly-FSN 100) in the electrolyte was very effective for promotion of $H_2$ bubbles on both nanoporous and polished Si photocathodes. Surprisingly, the nanoporous layer facilitates growth and release of $H_2$ bubbles more efficiently than the polished Si.

DETAILED DESCRIPTION

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

A surface with nanoscale periodic or aperiodic features can suppress reflectance by creating an optical density gradient from the air (in case of PEC application, water) to bulk of the body. The nanostructured surface, called a density-graded layer, consists of arrays of 1-dimensional structures, such as nanopores or nanowires with diameters smaller than the wavelength of incident photons, λ. In the case of Si, when the feature size at the air-silicon interface is smaller than 50 nm and the length of pores or nanowires is longer than 500 nm, the reflection is suppressed less than 2% across the whole solar spectrum with λ<1.3 mm. As a result, the nanostructured Si becomes an ideal solar absorber and, therefore, can be readily applicable to enhance the generation rate of $H_2$ by PEC water splitting. In addition, the enhanced surface area of the nanoporous, density-graded layer provides an extremely high surface reaction site for the photoelectrochemical $H_2$ reaction, thereby reducing the current density used to produce the same amount of photoelectrochemical products on a given area of semiconductor exposed to light, which reduces the overpotential at the photoelectrode. Moreover, it is suggested that the excited e-h pairs by photons in the space charge region effectively separate in 1-dimensional semiconductor structures due to the confined geometry.

Enhanced photoresponses of nanostructured Si photoelectrodes have been demonstrated using various redox couples for photoelectrochemical cells. For example, n-type nanotextured Si fabricated by photoelectrochemical etching showed improved photoelectrochemical conversion efficiency from reduced reflectance in concentrated HI, and n-type Si nanowire arrays by metal-assisted etching exhibited increased PEC efficiency from a large surface area in a solution containing $Br_2/Br^-$ redox couple. Enhanced photoresponses of arrays of Si nanowires grown by a vapor-liquid-solid mechanism also were reported in non-aqueous solutions with redox couples, and attributed to a large surface area and effective charge separation in the space charge region from 1-dimensionally confined geometry. However, very few studies were reported on nanostructured Si photocathodes for use of efficient $H_2$ production by photoelectrolysis of water by suppressing optical reflectance and increasing surface area.

Exemplary embodiments are disclosed of anti-reflective nanoporous silicon for efficient hydrogen production by photoelectrolysis of water. A nanoporous black Si is disclosed as an efficient photocathode for $H_2$ production from water splitting half-reaction. The nanoporous Si was fabricated by a metal-assisted etching technique and showed optical properties of a density-graded surface that is able to suppress reflectance less than about 2% over the whole solar spectrum without application of any AR coatings. Photoelectrochemical water splitting tests under simulated 1 sun illumination revealed that production rate of $H_2$ at the nanoporous Si photocathode increased about 20% due to enhanced photon absorption. In addition, the over-potential to create $H_2$ was reduced more than about 70 mV, originated from a large surface area. The nanoporous Si may promote $H_2$ gas evolution efficiently without sticking to the electrode surface and may reduce or eliminate the use of a surfactant.

Figure 1:
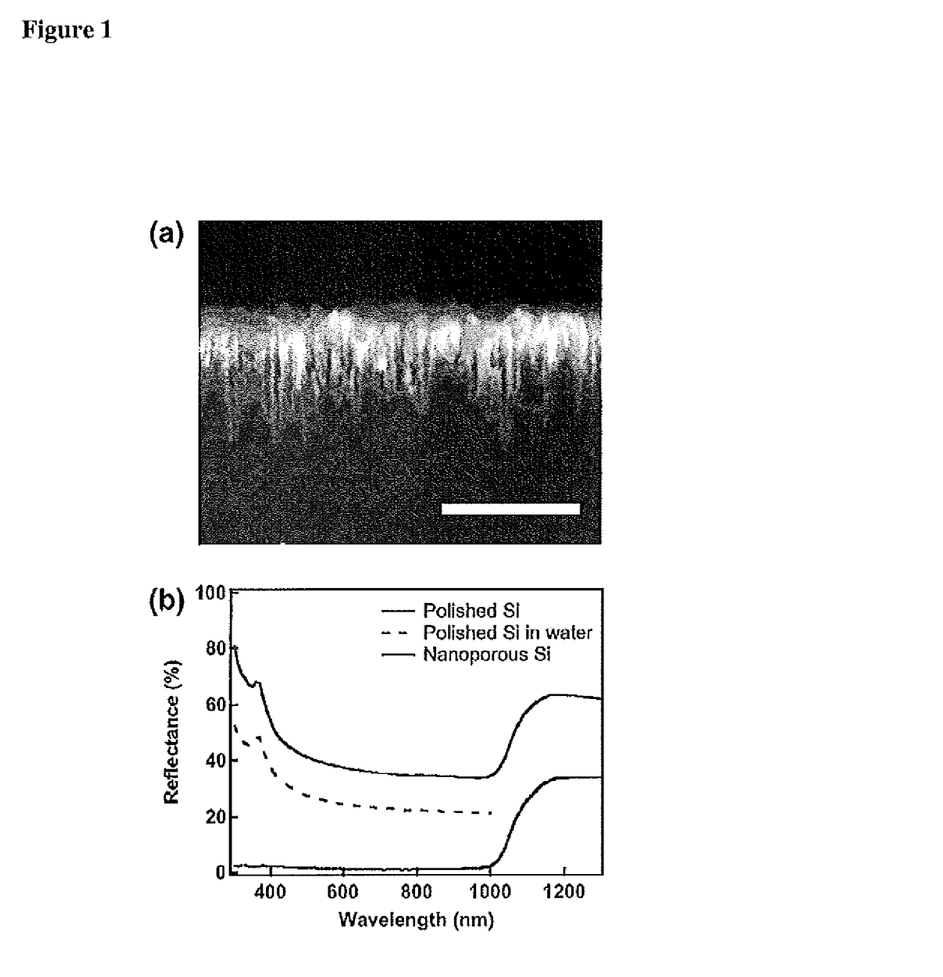
FIG. 1a. Illustrates nanostructure and optical reflectance of Si photocathodes via a cross-sectional scanning electron microscopy (SEM) image of nanoporous Si fabricated by one-step metal-assisted etching process. Conical shape of pores with diameter about 20 nm and non-uniform distribution of pore tips present optical properties of a density-graded layer to suppress optical reflectance. Scale bar=500 nm.
FIG. 1b. Illustrates a graph of the measured total hemispherical optical reflectance of polished and nanoporous Si in air, and calculated reflectance of polished Si in water. Nanoporous Si shows broadband anti-reflection properties with optical reflectance <2% over whole solar spectrum. Polished Si reflects about 25% of sunlight at the Si-water interface.

Exemplary embodiments may be better understood with reference to the Figures and the following discussion. FIG. 1 (a) shows a cross-sectional scanning electron microscopy (SEM) image of nanoporous Si used as a photocathode to produce $H_2$ from water. The nanoporous Si was fabricated with the single-step metal-assisted etching technique, by immersing a Si wafer in a mixed solution of $HAuCl_4$, HF, $H_2O_2$, and water. In the single-step metal-assisted etching, Au nanoparticles are formed in situ by reduction of $HAuCl_4$ by $H_2O_2$ in the Si etching solution, and catalyze the oxidation of Si with $H_2O_2$, as they contact the Si surface. At the same time, the oxidized Si is etched with HF and a vertically oriented nanoporous layer is formed as the etching proceeds to [001] directions on a (100) Si wafer. It should be noted that Au impurities with surface peak concentration of $10^{18}/cm^3$ still remain in the porous layer, even after removal of Au nanoparticles with an $I_2$/KI solution. As shown in FIG. 1 (a), the pores may have a conical shape with diameters of about 20 nm at the middle of the pores and a depth of about 590 nm. The pore tips may be distributed non-uniformly, so that the density gradually decreases from air to silicon bulk across the nanoporous layer and an optical density-graded layer forms. The surface area of the nanoporous Si may be increased about 17 times over the surface are of polished Si, assuming that average pore diameter and height are 20 nm and 500 nm, respectively, with 16% porosity, as estimated from the cross-sectional SEM image (FIG. 1 (a)).

FIG. 1 (b) shows the measured total hemispherical reflectance spectra of the nanoporous Si in air. Also shown are measured reflectance spectra of a polished Si in air and calculated reflectance spectra of a polished Si in water based on known optical constants of silicon and water. From FIG. 1 (b), it is clear that the nanoporous Si suppresses reflection over the entire solar spectrum with λ>Si bandgap. The average reflectance of the nanoporous Si in air, weighted with solar photon flux from about 350 to about 1000 nm wavelength in AM 1.5, is 1.38%. Lower reflectance of a polished Si is found in water compared to polished Si in air. This is due to the reduced difference in the refractive indices between Si and water. However, 24.77% of incident sunlight is still reflected away at a polished Si-water interface. When the optical absorption in Si is converted to current density for production of $H_2$, it is expected that the nanoporous Si generates 8.79 mA/cm² more photocurrent density than a polished Si in water under AM 1.5 sunlight with wavelength from about 350 to about 1000 nm and can produce $H_2$ at a rate of 41.71 mA/cm² using sunlight above the bandgap of Si, i.e., wavelength from about 350 to about 1100 nm. For comparison, Si with ideal optical absorption can generate 42.95 mA/cm² under similar illumination conditions.

Figure 2:
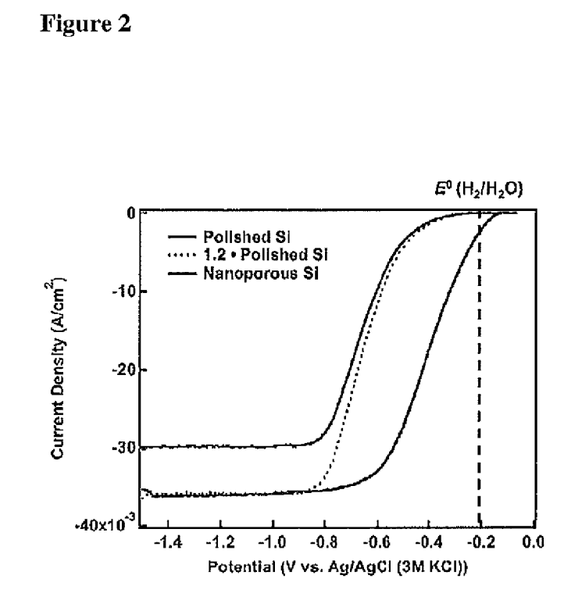

FIG. 2 shows photoelectrochemical responses of the nanoporous Si and the polished Si photocathodes for the reduction of water to $H_2$, measured in 0.5 M sulfuric acid with a surfactant under simulated 1 sun illumination. The limiting photocurrent density of the nanoporous Si, associated with maximum $H_2$ production rate at the semiconductor-water interface by PEC water electrolysis at given external bias, increased to about 36 mA/cm², compared to about 30 mA/cm² of the polished Si, demonstrating that suppression of the reflectance from the density-graded layer leads to enhanced $H_2$ production rate of 0.31 mmol $H_2/m^2$·s or about 6 mA/cm² in photocurrent density. In addition, as shown in FIG. 2, the current density-voltage, j-V, curve of the nanoporous Si photocathode shifted positively. The dotted line in FIG. 2 shows a j-V curve of the polished Si normalized to the limiting photocurrent density of the nanoporous Si, and indicates that the anodic shift of the j-V curve of the nanoporous Si is largely from the nanostructures itself, not from the increase in the photocurrent due to suppressed reflection.

The increase in effective surface area of an electrode over the projected area, $A_{eff}$, can reduce the overpotential, η, used to produce a photoelectrochemical reaction at the electrode, by $$\eta = a + b \log J - b \log A_{eff},  \quad \text{Eq. (1)}$$

when J, the current density over projected area, is much smaller than the limiting current. Here, a and b are photoelectrochemical constants that depend on physical properties of semiconductors and charge transfer kinetics at the semiconductor-water interface containing a redox couple. Typically, b can have various values larger than 60 mV, depending on the charge transfer mechanisms and physical and chemical states of the interface. According to Eq. (1), increased surface area of a nanostructured electrode leads to the reduction of the overpotential and the positive shift of j-V curves for the $H_2O$ splitting half-reaction to generate $H_2$. For example, in FIG. 2, the on-set voltage of the nanoporous Si, $V_{os}$, which are defined as a voltage where the reduction photocurrent occurs and/or exceeds the dark current, exhibits 70 mV of anodic shift; $V_{os}=-0.1$ V vs. Ag/AgCl (3M KCl) for the nanoporous Si and $V_{os}=-0.17$ V vs. Ag/AgCl (3M KCl) for the polished Si, respectively. Anodic shift at the half-wave voltage is about 240 mV. From Eq. (1) and the observed anodic shift, the $A_{eff}$ of nanoporous layer may be estimated to be about 10 to about 20, which agrees well with pore geometry shown in FIG. 1 (a). The dark current of the porous Si remained low, but slightly increased to 186 μA/cm² from 88 μA/cm² for the polished Si at the cathodic potential of -1.5 V vs. Ag/AgCl (3M KCl), due to increased surface area. It should be noted that Au impurities in the porous layer with a peak concentration of about $10^{18}$ cm$^{-3}$, which is equivalent to about 10 nm between each of the Au impurities, may contribute to the anodic shift of the j-V curve by the catalytic activity of the Au.

With increased limiting photocurrent from enhanced optical absorption of sunlight, anodic shift of photoreduction current from the increase in $A_{eff}$ of the nanoporous Si leads to enhanced rate for photoelectrolysis of water half-reaction, i.e., hydrogen production, at a lower external bias. For instance, at $E^0$ ($H_2/H_2O$), where water reduction half-reaction occurs thermodynamically, the nanoporous Si (about 2.2 mA/cm²) generates about 300 times more current density than the polished Si photoelectrode (about 7.46 μA/cm²). The nanoporous Si produced about 95% of the limiting photocurrent, equivalent to a $H_2$ production rate of about 1.77 mmol/m²·s with the application of about -0.65 V vs. Ag/AgCl (3 M KCl), while a polished Si produces about 14.4 mA/cm², or about 0.75 mmol/m²·s under similar circumstances. This indicates that the nanoporous Si uses only about 42% of area of a Si photoelectrode panel used to achieve the same $H_2$ production by the polished Si at the given external bias. This reduction on the used electrode area of the photocathode decreases to 17% when the limiting current is achieved for the polished Si. However, the polished Si electrode still uses an additional 200 mV of external voltage.

Figure 3:
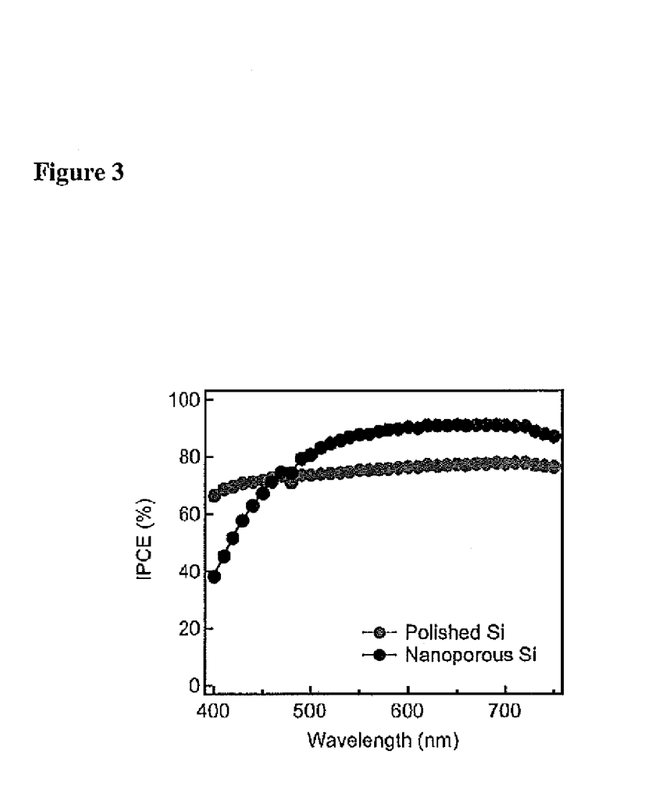

While a large effective surface area of the nanoporous Si provides increased reaction sites for $H_2$ production at reduced overpotential, it also implies increased the surface defect states that lead to loss of photo-excited charge carriers by surface recombination. FIG. 3 shows PEC spectral responses, or the incident-photon-to-current-conversion efficiency (IPCE), of the nanoporous Si and polished Si photoelectrode to reduce water to $H_2$ at V=-1.0 V vs. Ag/AgCl (3M KCl), where limiting photocurrent densities are achieved for both electrodes. As shown in FIG. 3, enhanced optical absorption by a density-graded layer of the nanoporous Si provides higher IPCE for photons with a wavelength larger than 470 nm. For example, the IPCE for $H_2$ production of the nanoporous Si is about 90% for photons with λ=600 nm, while that of the polished Si is about 76%. However, about 9% of absorbed photons with λ=600 nm in the nanoporous Si do not contribute to produce photocurrent, while nearly 100% of absorbed photons in the polished Si are used for $H_2$ generation, considering optical reflection at the Si-water interfaces. In addition, the IPCE of the nanoporous Si decreases with shorter wavelengths, and becomes smaller than, that of the polished Si at λ<470 nm. The poor spectral responses of the porous Si at short wavelengths are believed to be due to high surface recombination originating from increased surface area. Moreover, the remaining Au impurities in the porous layer can also increase the surface recombination velocity, leading to poor IPCE at shorter wavelengths. This implies that the total limiting photocurrent (i.e., the maximum $H_2$ production rate) decreases as $A_{eff}$ of the nanostructured electrode further increases. Therefore, for efficient $H_2$ production, it may be desirable to control the effective surface area of the anti-reflective nanostructure to optimize the balance between enhanced photo-limiting current and the reduced overpotential.

To maintain the maximum $H_2$ production rate for prolonged periods during PEC water splitting reaction, produced hydrogen molecules may be removed at the Si-water interfaces at a rate equal to or faster than the production rate. Since the hydrogen product leaves the interface via forming $H_2$ bubbles due to low solubility in water, an electrode to nucleate and release $H_2$ bubbles effectively from the surface may be employed.

Figure 4:
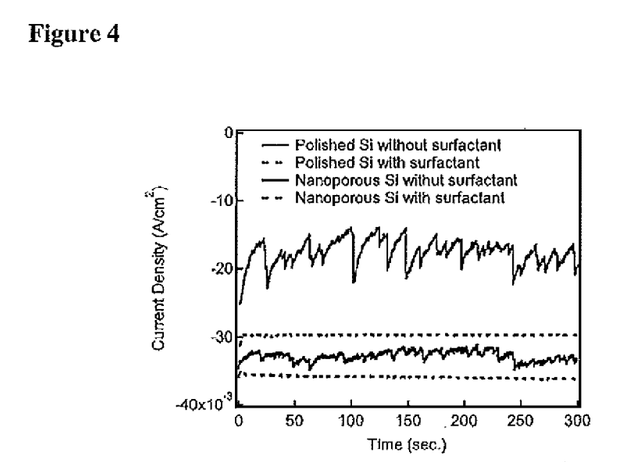

FIG. 4 shows the effect of a surfactant in an electrolyte and nanostructures of an electrode on $H_2$ gas evolution kinetics, measured by potentiostatic test in 0.5 M sulfuric acid at V=-1.5 V vs. Ag/AgCl (3M KCl). As shown in FIG. 4, both nanoporous and polished Si electrodes exhibit stable limiting photocurrent density in an electrolyte containing a surfactant, implying that the surfactant facilitates nucleation and release of the $H_2$ bubbles from the surface by lowering interface energy, even for the nanoporous Si with pores having a diameter of about 20 nm. Surprisingly, it has been found that the nanoporous Si promotes evolution of the bubbles more effectively than the polished Si, without use of surfactants. For example, the bubbles were smaller in size and released more frequently on the nanoporous surface than on the polished surface. FIG. 4 clearly demonstrates the effect of the nanoporous layer on the $H_2$ bubble evolution, showing that fluctuation of the current density, which is associated with change of effective surface area by growth and release of bubbles from the surface, is more severe on the polished Si than on the nanoporous Si surface. In fact, it has been discovered that arrays of vertically aligned nanowires and nanopores greatly promote evolution of bubbles at reduced superheat in the pool boiling heat transfer process, due to, in part, increased heterogeneous bubble nucleation density and changes in hydrophilicity of the surface. Since the bubble evolution at the heated surface in boiling draws similar analogy to a gas-evolving electrode in photoelectrochemistry, it is believed that nanopores and nanowires may provide active heterogeneous bubble nucleation sites to facilitate the $H_2$ evolution at the nanoporous electrode-water interface. Similarly, it further believed that nanoporous metallic electrodes may also be used in other gas-evolving applications, such as, water electrolysis.

Figure 5:
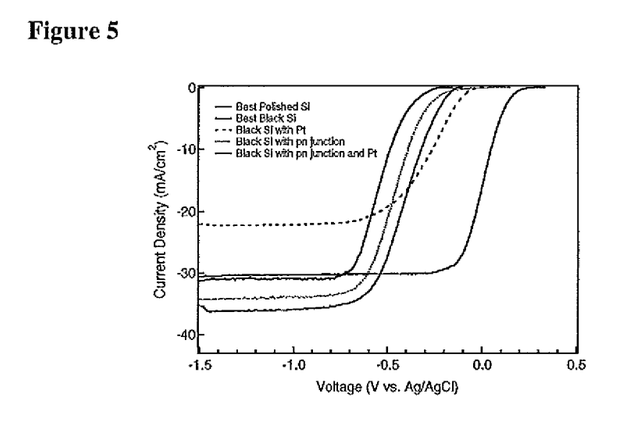
FIG. 5. Illustrates photoelectrochemical (PEC) j-V curves of nanoporous Si photocathodes with a hydrogen evolving catalyst (i.e., Pt) and buried pn junction for water splitting, half-reaction to produce $H_2$ under simulated 1 sun illumination. The j-V curves were scanned with −1.5V vs. A/AgCl (3M KCl) reference electrode to 0.05 V vs. open circuit voltage (OCV) in 0.5 M sulfuric acid with the addition of Zonyl-FSN 100 as a surfactant.

Hydrogen evolution on the nanoporous Si photocathode by PEC water splitting may be further enhanced by adding a hydrogen evolving catalyst (HEC) to the nanostructured surface. HECs may include, but are not limited to, Pt, Ni, Mo, Zn, Cu, Pd, Au, Fe, S, and alloys of these elements. HECs may be formed using various fabrication techniques including, but not limited to, chemical synthesis, electrodeposition, electroless deposition, physical vapor deposition, chemical vapor deposition, and atomic layer deposition. For example, FIG. 5 shows PEC j-V curves of nanoporous Si photocathodes with a hydrogen evolving catalyst (HEC), in this case Pt, for water splitting, half-reaction to produce $H_2$ under simulated 1 sun illumination. Adding Pt HEC further lowers $V_{os}$ about 150 mV.

Additionally, a buried pn junction may be formed on the nanoporous Si in order to enhance hydrogen evolution by PEC water splitting. These buried pn junctions may be formed by doping n-type dopants on p-type nanoporous Si for the water reduction half-reaction. The n-type dopants may include, but are not limited to, P, As, Sb, and similar n-type dopants. The doping process may include, but is not limited to, high temperature diffusion process, spin-on-dopant, high temperature drive-in, amorphous Si containing n-type dopant, and similar methods. For example, FIG. 5 shows PEC j-V curves of nanoporous Si photocathodes with Pt catalysts and a buried pn junction formed by a $POCl_3$ diffusion process, for water splitting, half-reaction to produce $H_2$ under simulated 1 sun illumination. Nanoporous Si photocathodes with a buried pn junction and the Pt catalysts lowers the $V_{os}$ by about 500 mV by providing additional photovoltage, compared to the nanoporous. Si without Pt catalysts or the buried pn junction.

In summary, efficient photoelectrochemical production of $H_2$ by water reduction half-reaction has been demonstrated using nanoporous Si photocathodes in direct contact with water. The nanoporous Si produced by a one-step metal-assisted etching technique provides broadband anti-reflection in water and a high density of surface reaction sites for $H_2$ production reaction. The nanoporous Si layer exhibits about a 20% increase in photocurrent density from suppressed reflection. The nanoporous Si layer also exhibits a reduction in the overpotential for $H_2$ generation of more than 70 mV, largely from a highly effective surface area. Furthermore, the nanoporous Si also promotes $H_2$ gas evolution efficiently without sticking to the electrode surface and reduces the use of surfactant. The $H_2$ evolution may be further improved by adding an HEC and a buried pn junction to the nanoporous Si. Finally, nanostructures with a density-graded layer may generally be applicable to other semiconductor materials, such as III-Vs, to enhance optical absorption and maximize, the photoelectrochemical reaction rate in contact with an electrolyte.

Example

For example, fabrication of a nanoporous Si: 300 μm thick p-type (100) float-zone Si wafers with 2.5 Ω·cm may be used as a photocathode. After RCA cleaning, an ohmic contact may be formed at the back of the Si by applying commercial Al paste (by way of example, but not limitation, Ferro® FX 053-038) and firing at approximately 800° C. During the high temperature Al alloying process, an approximately 5-10 μm thick heavily-Al doped layer may also form in the Si, which may serve as a back surface field to improve the minority carrier lifetime. A paraffin film may be applied to the backside ohmic contact in order to protect it from the metal-assisted etching solutions. The nanoporous Si may be formed on the exposed front surface by immersing it in 0.4 mM $HAuCl_4$ and then adding an approximately equal volume of 1:5:2 $HF:H_2O_2:H_2O$ solution for approximately 3 minutes. The remaining Au nanoparticles at the bottom of the pores after the etch procedure may be removed by means of an $I_2/KI$ solution. Finally, the paraffin film may be removed with trichloroethylene and rinsed with ethanol and isopropanol. After fabrication, the total reflectance spectra of the nanoporous Si in air was measured using a Varian Cary 6000i spectrometer with an integrated sphere. The porous structures were observed with a SEM.

For Photoelectrochemical characterization (PEC) measurement, the backside Al layer of the Si was contacted with silver paint and Cu wires encapsulated in a glass tube. The edge and the exposed backside of the electrodes were sealed with an industrial epoxy (Rocktite 9462), and only the front Si surface was exposed to an electrolyte. Prior to the PEC measurement, native oxide on Si photocathodes was removed by 10% HF solution. A custom-built Pyrex glass with flat windows was used for a PEC cell. A tungsten-halogen lamp (250 W, Oriel®) with an IR cutoff filter was employed as a light source and the light intensity was calibrated with a photodiode (Solarex, Serial No. 147) to simulate 1 sun illumination. 0.5 M sulfuric acid was used as an electrolyte. A small amount (2 g/L) of Zonyl®-FSN 100 (DuPont™) was added as a surfactant to promote $H_2$ bubble evolution. Ag/AgCl (3M KCl) and Pt foil were used as a reference electrode and a counter electrode, respectively. Electrochemical measurements were carried out utilizing a potentiostat (Solartron 1287) interfaced with a personal computer. Before each measurement shown in FIG. 2 and FIG. 3, the photocathodes were hydrogenated with an application of $-1.5$ V vs. Ag/AgCl (3M KCl) for 5 minutes under illumination. The photoelectrochemical j-V curves were scanned on Si photocathodes by applying between approximately $-1.5$ V vs. Ag/AgCl (3M KCl) and approximately $+0.05$ V vs. OCP (open circuit potential) with a rate of 20 $mVs^{-1}$. An IPCE measurement was made with a W lamp (100 W) passing through a monochrometer (Bausch & Lomb) of approximately 400 nm to 750 nm with an external bias of $-1.0$ V vs. Ag/AgCl (3M KCl). A Si photodiode (Hammamatsu) with a known quantum efficiency was used to calculate the IPCE of the nanoporous and polished Si photocathodes.

It is noted that the example discussed above is provided for purposes of illustration and is not intended to be limiting. Still other embodiments and modifications are also contemplated. While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

The invention claimed is:

1. A photocathode comprising:
   a nanoporous black Si photocathode configured for $H_2$ production from water splitting, half-reaction, wherein the nanoporous black Si photocathode is fabricated by metal-assisted etching technique, and wherein the nanoporous black Si photocathode comprises an antireflective, density-graded surface without antireflective coatings.

2. The photocathode according to claim 1, wherein the nanoporous black Si is configured to suppress reflectance less than about 2% over a whole solar spectrum without application of any antireflective coatings.

3. The photocathode according to claim 1, wherein the nanoporous black Si is configured to reduce the over-potential to create $H_2$ by more than about 70 mV due to a large surface area of the nonporous black Si.

4. The photocathode according to claim 1, wherein the nanoporous black Si is configured to promote $H_2$ gas evolution efficiently without sticking to the nonporous black Si without use of a surfactant.

5. The photocathode according to claim 1, wherein the nanoporous black Si comprises nanostructures.

6. The photocathode according to claim 1, wherein the nanoporous black Si comprises an array of nanowires.

7. The photocathode according to claim 1, wherein the nanoporous black Si comprises an array of nanopores.

8. The photocathode according to claim 1, wherein the nanoporous black Si further comprises hydrogen evolving catalyst configured to reduce overpotential to create $H_2$ more than about 100 mV.

9. The photocathode according to claim 8, wherein the hydrogen evolving catalyst comprises at least one of Pt, Ni, Mo, Zn, Cu, Pd, Au, Fe, and S.

10. The photocathode according to claim 1, wherein the nanoporous black Si further comprises at least one buried pn junction, wherein the at least one buried pn junction is configured to reduce overpotential to create $H_2$ by about 500 mV.

11. The photocathode according to claim 1, wherein the nanoporous black Si is configured to produce $H_2$ at about 20% above polished Si due to enhanced photon absorption in 1 sun illumination.

12. A device comprising:
an anti-reflective, nanostructured, black silicon photocathode configured for hydrogen production by photoelectrolysis of water with water splitting half-reaction; wherein the anti-reflective, nanostructured, black silicon photocathode is fabricated by metal-assisted etching; wherein the anti-reflective, nanostructured, black silicon photocathode comprises a density-graded surface configured to suppress reflectance less than about 2% over whole solar spectrum without any anti-reflection coatings; wherein the anti-reflective, nanostructured, black silicon photocathode promotes $H_2$ gas evolution efficiently without use of a surfactant; and wherein the anti-reflective, nanostructured, black silicon photocathode comprises hydrogen evolving catalyst configured to reduce over-potential to create $H_2$ more than about 100 mV.

13. A device comprising:
a vessel defining a photoelectrical-chemical (PEC) cell, the vessel holding an electrolyte solution; and
a photocathode exposed to the electrolyte that includes:
a first surface having a nanoporous black silicon layer; and
a second surface having at least one ohmic contact;
wherein the first surface is exposed to the electrolyte.

14. The device of claim 13 further comprising:
an encapsulate sealing at least part of the photocathode such that only the first surface of the photocathode is exposed to the electrolyte.

15. The device of claim 13 further comprising:
a back surface field layer comprising a region where the ohmic contact has alloyed with the second surface.

16. The device of claim 13, the first surface further having a hydrogen evolving catalyst (HEC) incorporated onto the surface of the nanoporous black silicon.

17. The device of claim 16, wherein the hydrogen evolving catalyst comprises at least one of Pt, Ni, Mo, Zn, Cu, Pd, Au, Fe, and S.

18. The device of claim 13, further comprising:
a light source configured to illuminate the photocathode.

19. The device of claim 13, further comprising at least one of:
a reference electrode; and
a counter electrode.

20. The device of claim 13, the nanoporous black silicon layer further comprising a buried pn junction.

* * * * *